US011361012B1

(12) United States Patent
Manchala

(10) Patent No.: US 11,361,012 B1
(45) Date of Patent: *Jun. 14, 2022

(54) METHODS AND SYSTEMS FOR INTERACTIVE RESEARCH REPORT VIEWING

(71) Applicant: Trasers, Inc., Santa Clara, CA (US)

(72) Inventor: Srikanth Manchala, Saratoga, CA (US)

(73) Assignee: Trasers, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/154,896

(22) Filed: Jan. 21, 2021

Related U.S. Application Data

(63) Continuation of application No. 16/597,928, filed on Oct. 10, 2019, now Pat. No. 10,929,451, which is a continuation of application No. 16/209,981, filed on Dec. 5, 2018, now Pat. No. 10,482,116.

(51) Int. Cl.

| | | |
|---|---|---|
| *G06F 16/34* | (2019.01) | |
| *G06F 16/338* | (2019.01) | |
| *H04L 65/401* | (2022.01) | |
| *G06F 16/22* | (2019.01) | |
| *G06F 16/93* | (2019.01) | |

(52) U.S. Cl.
CPC .......... *G06F 16/345* (2019.01); *G06F 16/338* (2019.01); *H04L 65/4015* (2013.01)

(58) Field of Classification Search
CPC ... G06F 16/345; G06F 16/338; H04L 65/4015
See application file for complete search history.

(56) References Cited

U.S. PATENT DOCUMENTS

| | | |
|---|---|---|
| 6,643,660 B1 | 11/2003 | Miller |
| 7,219,301 B2 | 5/2007 | Barrie |
| 7,886,327 B2 | 2/2011 | Stevens |
| 7,930,302 B2 | 4/2011 | Bandaru |

(Continued)

FOREIGN PATENT DOCUMENTS

IN    1801DE2014 A   *  7/2015

OTHER PUBLICATIONS

IEEE Learn about IEEE Institutional Subscription Terms Of Use, Jan. 24, 2010, 3 pages.

(Continued)

*Primary Examiner* — Yongjia Pan

(57) ABSTRACT

Method and systems for interactive research report viewing are disclosed. The method includes receiving a user request to access a research content in a report viewing platform present in a user device. The method includes causing display of the research content in the report viewing platform. The method includes provisioning one or more interactive tools in report viewing platform to be used by a user of the user device. The method includes receiving at least one user interaction input to the research content using the one or more interactive tools. The at least one user interaction input comprises an insight note provided into the research content. The method includes receiving a sharing request to share the research content with the at least one user interaction input with at least one contact of the user. The method further includes sharing the research content with at least one contact of the user.

20 Claims, 11 Drawing Sheets

(56) References Cited

U.S. PATENT DOCUMENTS

| | | | |
|---|---|---|---|
| 7,991,838 B2 | 8/2011 | Bolf | |
| 8,145,532 B2 | 3/2012 | Jones | |
| 8,578,260 B2 | 11/2013 | Mayor | |
| 8,601,572 B2 | 12/2013 | King | |
| 9,135,234 B1 | 9/2015 | Maltos | |
| 10,269,457 B2* | 4/2019 | Palter | G16H 80/00 |
| 10,482,116 B1 | 11/2019 | Manchala | |
| 2002/0013782 A1 | 1/2002 | Ostroff | |
| 2002/0035697 A1 | 3/2002 | McCurdy | |
| 2002/0042733 A1* | 4/2002 | Lesandrini | G06Q 30/0226 705/7.32 |
| 2006/0069589 A1 | 3/2006 | Nigam | |
| 2006/0085351 A1 | 4/2006 | Hug | |
| 2007/0055581 A1 | 3/2007 | Block | |
| 2007/0255687 A1 | 11/2007 | Al-Yousuf | |
| 2007/0282680 A1 | 12/2007 | Davis | |
| 2008/0288324 A1 | 11/2008 | Graczynski | |
| 2009/0216623 A1 | 8/2009 | Hendricks | |
| 2009/0319342 A1 | 12/2009 | Shilman | |
| 2010/0325584 A1 | 12/2010 | McKenzie | |
| 2011/0119576 A1 | 5/2011 | Aumann | |
| 2013/0027401 A1 | 1/2013 | Hobbs | |
| 2013/0166396 A1 | 6/2013 | Achler | |
| 2013/0254195 A1 | 9/2013 | Chen | |
| 2013/0346497 A1 | 12/2013 | Hofmayer | |
| 2014/0052842 A1 | 2/2014 | Gangadharaiah | |
| 2014/0310017 A1 | 10/2014 | Palter | |
| 2016/0063440 A1* | 3/2016 | Webb | H04L 65/403 705/7.24 |
| 2016/0110313 A1 | 4/2016 | Prakash | |
| 2019/0155870 A1 | 5/2019 | Prakash | |

OTHER PUBLICATIONS

John Jackson, New E-Resource: IEEE Journals Archive, Jun. 27, 2017, 5 pages.
Wiley Online Library—Introductory Video, Aug. 16, 2010, 1 page.
Language tags in HTML and XML, accessed Mar. 31, 2019, 6 pages.

\* cited by examiner

METHODS AND SYSTEMS FOR INTERACTIVE RESEARCH REPORT VIEWING

PRIORITY AND TECHNICAL FIELD

This application is a continuation of U.S. patent application Ser. No. 16/597,928, filed on Oct. 10, 2019, on behalf of first-named inventor Srikanth Manchala for "Methods and systems for interactive research report viewing," which in turn is a continuation of U.S. patent application Ser. No. 16/209,981, filed on Dec. 5, 2018, on behalf of first-named inventor Srikanth Manchala for "Methods and systems for interactive research report viewing" (now U.S. patent Ser. No. 10/482,116). Each aforementioned application is hereby incorporated by reference.

Embodiments of the disclosure relate generally to digital report viewing and, more particularly to, methods and systems for interactive research report viewing.

BACKGROUND

Typically, research information is available freely in a public domain or can be accessed through paid subscriptions. Researchers and other users while executing research access the research information through web pages, spreadsheets, power points, and word documents which are all saved in form of PDFs. Since web pages, PDF, spreadsheets, etc., are prone to plagiarism, an author and research team may have a risk of losing all the hard work and potential value of the research.

Current platforms providing research information provide limited functionalities for users of the platform. These platforms do not provide options for a user to capture their own notes or interpretations on the research information and also there is no mechanism through which the user can share/collaborate with their teams/peers to discuss further on the research information mentioned in the report or interact with the authors. The platforms generally support one or two languages, so the user can access the reports in the supported languages only which may be a drawback for researchers from remote parts of the world who may be unfamiliar with the supported languages.

In the light of the above discussion, there is a need for techniques that provide interactive research report viewing on a platform that enables a user to engage with the report and collaborate with other researchers working in a related field.

SUMMARY

Various embodiments of the present disclosure provide methods and systems for interactive research report viewing.

In an embodiment, a method of interactive research report viewing is disclosed. The method includes receiving a user request to access a research content in a report viewing platform present in a user device. The method includes causing display of the research content in the report viewing platform. The method includes provisioning one or more interactive tools in the report viewing platform to be used by a user of the user device. The method includes receiving at least one user interaction input to the research content using the one or more interactive tools. The at least one user interaction input comprises an insight note provided into the research content. The method includes receiving a sharing request to share the research content with the at least one user interaction input with at least one contact of the user. The at least one contact is a subscriber of the report viewing platform. The method further includes sharing the research content with at least one contact of the user.

In another embodiment, a server system of interactive research report viewing is disclosed. The server comprises a memory to store instructions and a processor to execute the stored instructions in the memory and thereby cause the system to receive a user request to access a research content in a report viewing platform present in a user device. The server system is further caused to cause display of the research content in the report viewing platform. The server system is further caused to provision one or more interactive tools in the report viewing platform to be used by a user of the user device. The server system is further caused to receive the at least one user interaction input to the research content using the one or more interactive tools. The at least one user interaction input comprises an insight note provided into the research content. The server system is further caused to receive a sharing request to share the research content with the at least one user interaction input with at least one contact of the user. The at least one contact is a subscriber of the report viewing platform. The system is further caused to share the research content with at least one contact of the user.

In yet another embodiment, a method of interactive research report viewing is disclosed. The method includes receiving a user request to access a research content in a report viewing platform present in a user device. The method includes causing display of the research content in the report viewing platform. The method includes provisioning one or more interactive tools in the report viewing platform to be used by a user of the user device. The method includes receiving a sharing request to share the research content with at least one contact of the user. The at least one contact is a subscriber of the report viewing platform. The method includes receiving at least one user interaction input to the research content using the one or more interactive tools. The at least one user interaction input comprises at least one of: (1) an insight note provided into the research content; (2) a feedback for at least one author of the research content; (3) a community networking request for support on topic related to the research content; (4) a custom search request for performing a case study on issues, opportunities and approaches of a business establishment; and (5) a contribution provided into the research content. The method further includes sharing the research content with at least one contact of the user.

BRIEF DESCRIPTION OF THE FIGURES

For a more complete understanding of example embodiments of the present technology, reference is now made to the following descriptions taken in connection with the accompanying drawings in which.

Figure 1:
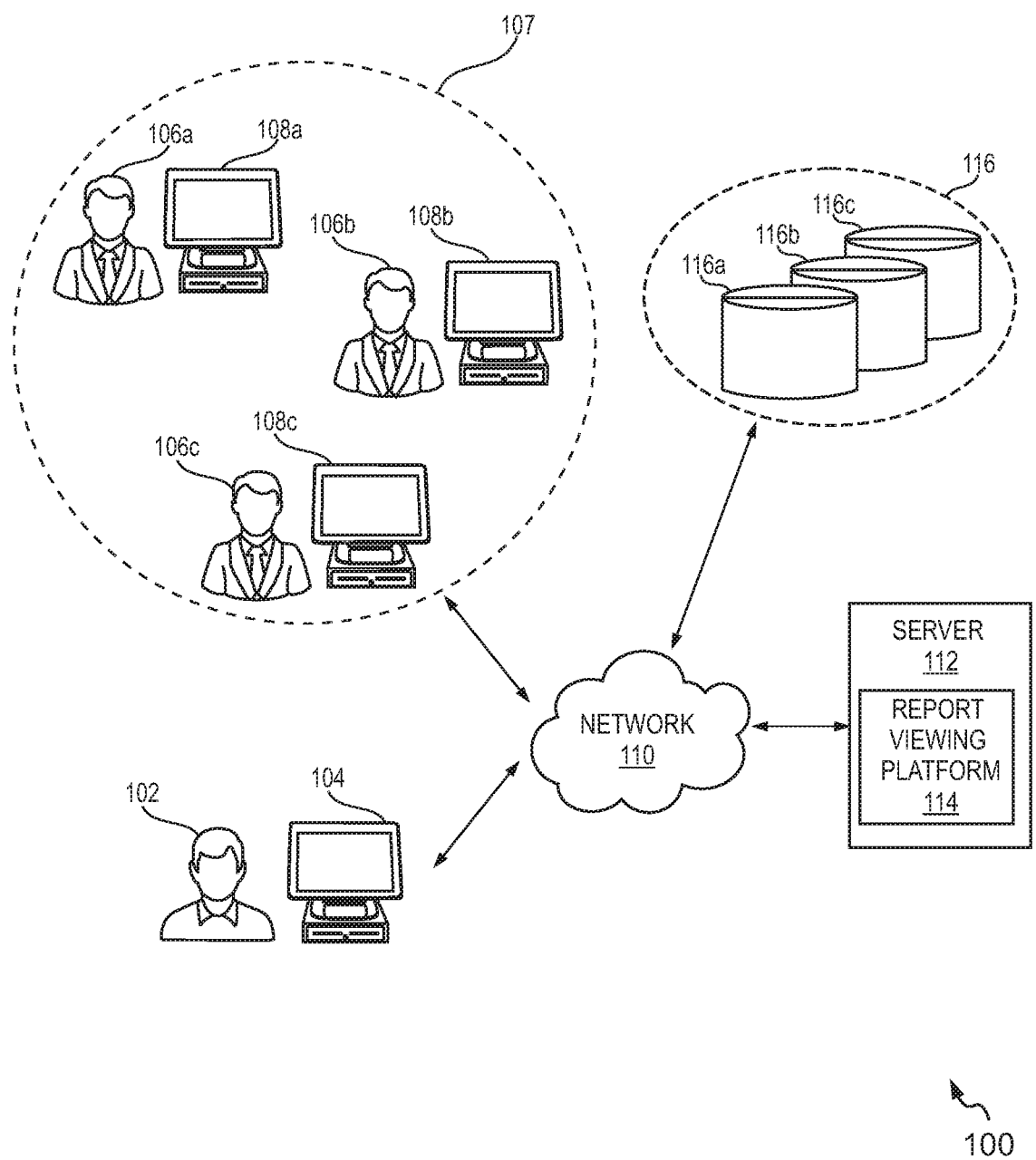
FIG. 1 is an illustration of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. The term research content refers to any kind of information earthed out from documents, such as print media journals, magazines periodicals and communication artifacts, which might be texts of various formats, pictures, audio or video for viewing on a report viewing platform. It shall be noted that the terms 'research content' and 'research report' have been used interchangeably throughout the description.

OVERVIEW

Various example embodiments of the present disclosure provide methods and systems for interactive research report viewing. More specifically, embodiments provide one or more interactive tools for an user accessing a research content to engage with the research report.

A user may use a dedicated report viewing platform presented at a user device associated with the user for viewing research content (also referred to as 'a research report'). The research content is displayed on the report viewing platform in response to a user request for accessing the research content. The report viewing platform may query a plurality of databases to get the relevant research content or may access a database associated with report viewing platform for retrieving the research content. In some example embodiments, a summary of the research content is initially displayed to the user and the user may have to subscribe and/or pay for accessing the research content in entirety. Once the user purchases the research content, the research content comprising one or more interactive tools is displayed to the user on the report viewing platform. The one or more interactive tools provided in the research content can be used by the user to engage with the research content/report.

The one or more interactive tools can be used by the user to provide at least one user interaction input to the research content. The at least one user interaction input can comprise an insight note provided into the research content or a feedback for the author of the research content or a contribution to a survey, blog, case study etc. The one or more interactive tools can also be used by the user to share the research content and/or the at least one user interaction input with at least one contact of the user. The user can also share custom search requirements on the report viewing platform via the one or more interactive tools.

The interactive tools of the report viewing platform include an artificial intelligence enabled chatbot (also referred to as 'an interactive virtual agent') that can help the user in engaging with the research report displayed to the user by asking questions/queries about the research content and/or support for navigating through the research content seamlessly. Further, the one or more interactive tools also facilitate a community networking facility. The community networking facility provided by the report viewing platform can be accessed by the user to post questions related to the research content and request for additional insights.

The term "interactive tools" refers to the intuitive features that are provided in the report viewing platform for enabling a user to explore and interact digitally with the research reports displayed on the report viewing platform.

Various embodiments of accessing the one or more interactive tools for providing the at least one user interaction input on the research content via the report viewing platform for interactive research report viewing is explained with reference to FIGS. 1-8.

FIG. 1 is an illustration of an environment 100 where at least some example embodiments may be practiced. The environment 100 includes a wireless communication network (e.g., a network 110) that connects entities such as, an author 102, a plurality of users 106a, 106b and 106c working in an organization 107, a server 112 and databases 116a, 116b and 116c (hereinafter collectively referred to as 'a database 116'). In an embodiment, the databases 116a, 116b, 116c are distributed and decentralized. The author, users and databases, shown in the illustrative representation of the environment 100, are only for depiction purposes, and there may be multiple such authors, users, and databases in actual application of the disclosure.

The author 102 is depicted to be associated with an electronic device 104 (hereinafter referred to as an 'author device 104'). In at least one example embodiment, the author device 104 is equipped with a report viewing platform 114 that facilitates interactive research report viewing. The author device 104 may be any communication device having hardware components for enabling User Interfaces (UIs) of the report viewing platform 114 to be presented on the author device 104. The author device 104 may be capable of being connected to a wireless communication network (such as the network 110). Examples of the author device 104 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like. In an embodiment, the author 102 may accesses the report viewing platform 114 for reviewing his/her research work/content that is stored in the database 116 associated with the report viewing platform 114.

The plurality of users 106a, 106b and 106c are depicted to be associated with one or more devices. For example, the user 106a is associated with the device 108a, the user 106b is associated with the device 108b and the user 106c is associated with the device 108c. Each of the devices 108a, 108b and 108c may be equipped with an instance of the report viewing platform 114. The report viewing platform 114 facilitates display of a research content requested by a user (e.g., the user 106a), and also facilitates sharing of the research content with other users, such as the user 106b and the user 106c. The research content may be shared with users outside the organization 107, for example, a friend, an associate or an acquaintance who may be working on the research content and/or related research content. However, it shall be noted that any user accessing the research content must have credentials provided by the report viewing platform 114 and the credentials may be provided upon registration/subscription for services provided by the report viewing platform 114. For example, each user of the plurality of users 106a, 106b and 106c must register with the report viewing platform 114 for using its services.

In an embodiment, the server 112 provides a software application, herein referred to as the report viewing platform 114, in response to a user request received from the author device 104 or the devices 108a, 108b, 108c (associated with the users 106a, 106b, 106c, respectively) via the network 110. Examples of the network 110 include stand alone or a combination of a local area network (LAN), a wide area network (WAN), wireless, wired, any currently existing or to be developed network that can be used for communication. More specifically, an example of the network 110 can be the Internet which may be a combination of a plurality of networks. In some embodiments, the report viewing platform 114 may be factory-installed on the author device 104 and the devices 108a, 108b, 108c and the author 102 and the plurality of users 106a, 106b, 106c may not need to specifically request the report viewing platform 114 from the server 112.

In at least one example embodiment, a user (e.g., the user 106c) from the plurality of users 106a, 106b and 106c may access the report viewing platform 114 for searching a research content. After receiving the request from the user 106c, the report viewing platform 114 may collect research document/content from a plurality of other report viewing platforms whose data is stored in the database 116 and may display the requested research content to the user 106c. The research content displayed to the user 106c on a user interface of the report viewing platform 114 may include one or more interactive tools which may allow the user 106c to engage with the research content and the author (e.g., the author 102) of the research content. The user may provide at least one user interaction input to the research content using the one or more interactive tools. The user interaction input may include but are not limited to an insight note, a feedback, a request for additional insights, engaging with a chatbot (also referred to as an 'interactive virtual agent') provided in the report viewing platform 114, text highlighting etc. The interactive tools may also allow the users 106c to share the research content along with the user interaction input with other users (e.g., the user 106b and 106c) of the report viewing platform 114. Sharing the research content along with the user interaction input provisions opportunities for the user 106c to collaborate with other users, request for additional insights, strategize, plan and work on the research content and/or related research content.

In at least one example embodiment, the report viewing platform 114 may display the research content on a UI in an interactive HTML report viewer format. The UI may include sections-wise tabs, such as summary, insights, recommendations, appendix etc., on top (see, FIGS. 4A-4D) of the UI. The user can immediately jump to a specific section that he/she intends to read by navigating between the sections-wise tabs. The one or more interactive tools are provided at a bottom of the UI. Each interactive tool of the one or more interactive tools includes a specific feature that enables the user to engage/interact with the research report in real-time. Using the one or more interactive tools, the user can give feedback to the author (e.g., the author 102) of the research content, and can contribute in form of survey participation, blogs, case studies, and comments. The report viewing platform 114 is a multilingual platform and can support viewing of the research content in a plurality of languages.

The report viewing platform 114 may be an application/tool resting at the server 112. In an embodiment, the server 114 is configured to host and manage the report viewing platform 114 and communicate with user devices, such as the author device 104, and the devices 108a, 108b and 108c. The report viewing platform 114 may be accessed through the web via the network 110. In another embodiment, the author device 104 and the devices 108a, 108b and 108c may access an instance of the report viewing platform 114 from the server 114 for installing on the author device 104 and the devices 108a, 108b and 108c using application stores associated with including but not limited to Apple iOS™, Android™ OS, Google Chrome OS, Windows®, BlackBerry® OS, Embedded Linux, web OS, Palm OS® or Palm Web OS™, and the like. Alternatively, the report viewing platform 114 may be accessed through the web using the Internet.

Figure 7:
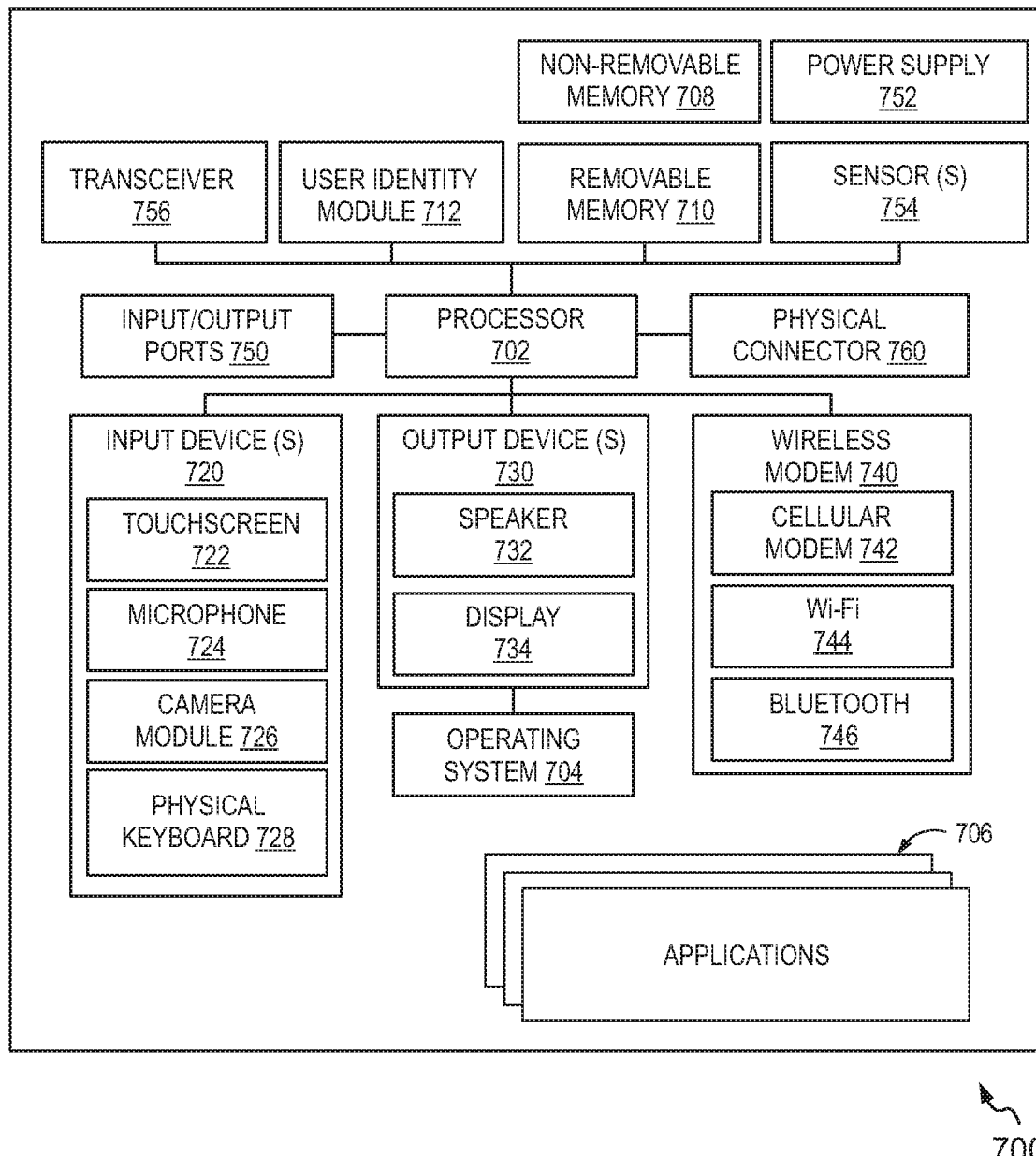
FIG. 7 is a block diagram of a user device, in accordance with an example embodiment.

It is noted that the instructions (or the executable code) configuring the report viewing platform 114 are stored in a memory of the server 112, and the instructions are executed by a processor (for example, a single-core or a multi-core processor) included within the server 112, as exemplarily shown with reference to FIG. 7. Accordingly, even though the various functionalities for interactive research report viewing are explained with reference to or being performed by the report viewing platform 114, it is understood that the processor in conjunction with the executable code in the memory is configured to execute the various tasks as enabled by the instructions of the report viewing platform 114.

The various components of the report viewing platform 114 are further explained with reference to FIG. 2.

Figure 2:
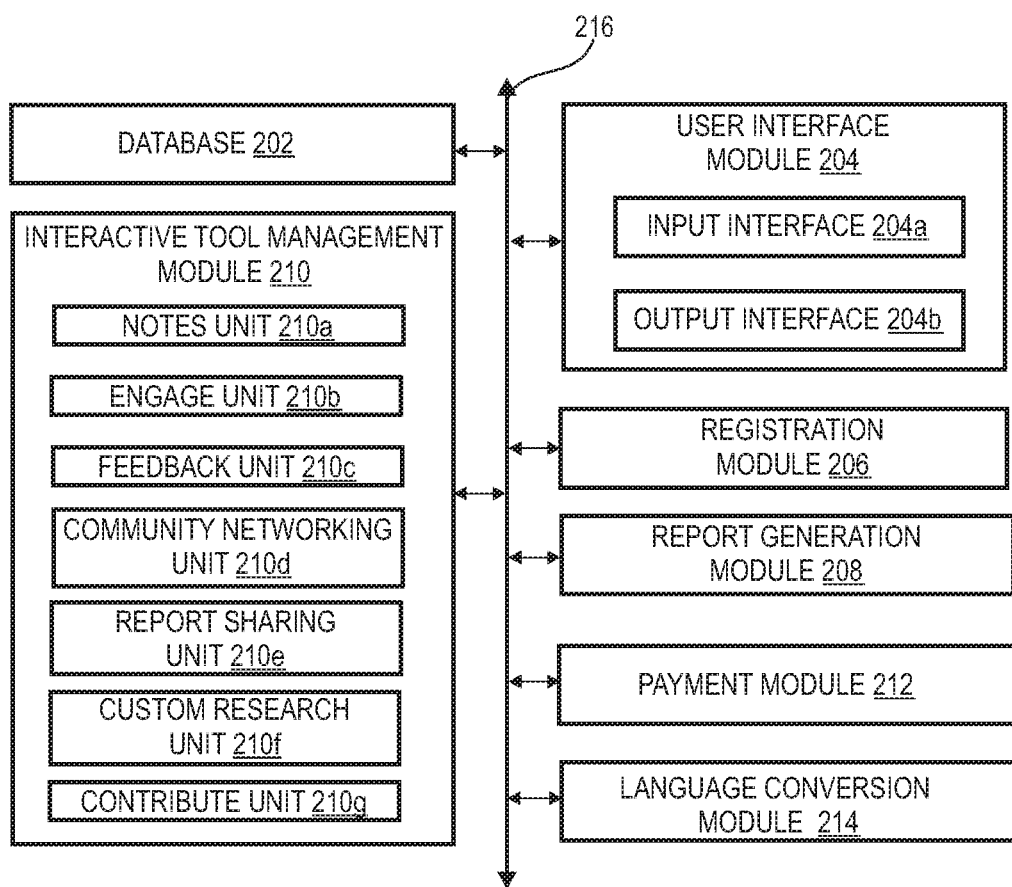
FIG. 2 is a block diagram of a system for interactive research report viewing, in accordance with an example embodiment.

FIG. 2 is a block diagram of a system 200 for interactive research report viewing, in accordance with an embodiment. The system 200 is configured to manage the report viewing platform 114. The system 200 enables the user to search for research content and display an interactive research report/content based on a user request. The interactive research report/content allows the users to collaborate with other users of the platform, capture comments, get responses for comments, share the interactive research content with registered users (within and outside the organization) based on subscription plans of respective users. The system 200 may be embodied in a server system, for example, the server 112 or an electronic device, such as, the devices 108a, 108b and 108c accessible by the users 106a, 106b and 106c. The system 200 comprises a database 202, an user interface module 204, a registration module 206, a report generation module 208, an interactive tool management module 210, a payment module 212, a language conversion module 214 and a centralized circuit system 216.

The database 202 is configured to store information about each user of a plurality of users using the system 200. Additionally or optionally, the database 202 also stores details of subscription plans of the plurality of users of the report viewing platform. The database 202 is configured to store a plurality of research content submitted by a plurality of authors. The research content in the database 202 is organized and stored based on industry type. For example, if research content is related to an automotive industry, then the research content will be stored under the automotive industry table in the database 202. Similarly, a plurality of tables is created in the database 202 for a plurality of industries for facilitating storage of research content from respective industries.

The user interface (UI) module 204 is configured to present one or more UIs for facilitating interactive research report viewing to a user (e.g., the user 106a) of the system 200. The UI module 204 comprises an input interface 204a and an output interface 204b. The input interface 204a is configured to receive a user request for accessing a research content. The input interface 204a is also configured to receive user interaction inputs on the research content for engaging/interacting with the research content and/or other users/researchers working with the research content. Examples of the input interface 204a may include, but are not limited to, a keyboard, a mouse, a joystick, a keypad, a touch screen, soft keys, and the like. The output interface 204b is configured to display at least a research report/content to the user. The research report/content displayed by the output interface 204b can be an interactive research content which provisions one or more interactive tools on the research content for the user thereby facilitating the user to interact with the research report/content. Examples of the output interface 204b may include, but are not limited to, a display such as a light emitting diode display, a thin-film transistor (TFT) display, a liquid crystal display, an active-matrix organic light-emitting diode (AMOLED) display, and the like.

The registration module 206 is configured to create and store a record of every user who wants to register himself with the system 200. The record may contain information such as a name of the user, age of the user, address of the user, contact number of the user, name of an organization or an institute he/she is working with, details about research work submitted by the user, subscription plan of the user etc. Once the user is registered with the system 200, he/she can use the facilities, like viewing interactive research content, sharing research content etc., provided by the system 200.

The report generation module 208 is in communication with the user interface module 204. The report generation module 208 is configured to access the research content based on a user request received through the user interface module 204. The report generation module 208 may first search for the industry in which the user is looking for content, and based on that, the report generation module 208 may look for the research content in the database 202 corresponding to the industry. After retrieving the requested research content, the report generation module 208 may prepare the report by arranging the content in the required format and display on the output interface 204b of the user interface module 204. Additionally or optionally, the report generation module 208 may provide suggestions of one or more research contents related to the user request.

The interactive tool management module 210 is in communication with the user interface module 204. The interactive tool management module 210 is configured to provision and manage one or more interactive tools on the research content in the output interface 204b. The interactive tool management module 210 comprises a notes unit 210a, a engage unit 210b, a feedback unit 210c, a community networking unit 210d, a report sharing unit 210e, a custom research unit 210f and a contribute unit 210f.

In an embodiment, the notes unit 210a is configured to capture and save an insight note written by a user, such as a user 106a on the research content displayed to the user. The notes unit 210a enables the user to edit the insight note written previously by the user and to copy and paste text or links from outside while writing the insight note on the research report. The notes unit 210a is also configured to invoke the same insight note when the same report is re-opened. In some example embodiments, the notes unit 210a also provisions an option for the user to create a slide from the insight notes provided by the user on the research content via the one or more interactive tools. The slide created by the notes unit 210a can be viewed by the user, imported to another program/document and/or shared by the user with at least one contact of the user. In at least one example embodiment, the notes unit 210a also enables the user to email insight note provided on the research report.

The engage unit 210b is configured to enable and manage an interactive virtual agent associated with the system 200. In an embodiment, the user may provide one or more queries related to the research content on the interactive virtual agent. The interactive virtual agent is configured to identify an intent of the query from the query and select a response for the query from a plurality of responses pre-stored in the database 202. For example, the chatbot is programmed with frequently asked questions (FAQs) and answers which help in guiding the user on the research report and/or queries related to navigation on the report viewing platform 114. The chatbot is also programmed to give a friendly response, such as "Thanks—I will review this request/question/feedback and get back to you soon", if the chatbot is unable to answer the user query. In an embodiment, the engage unit 210b saves the user queries and sends a corresponding email defining user queries to an author/KPO team responsible for handling the reports.

The feedback unit 210c is configured to save feedbacks obtained on the research report from the plurality of users and to send an auto email to the author of the report describing feedbacks. The feedback unit 210c also sends an acknowledgement to the user providing a feedback. The feedbacks are saved based on sections of the research report. For example, if the feedback is received on summary then feedback will be saved in summary section. Further, the feedback unit 210c is also configured to auto correct language issues if any language issues are present on the research report. In at least one example embodiment, a plurality of feedbacks from one or more users associated with the research report are collected and a sentiment analysis may be performed on the plurality of feedbacks to generate at least a brief summary and a unique feedback to the at least one author. In one example, one or more problems may be identified based on performing sentiment analysis on the plurality of feedbacks. The one or more problems are shared/reported to one or more users associated with the research content and the author. For example, if a common issue is identified from the feedbacks which may be an option for research, the common issue is presented along with the research content. The community networking unit 210d is configured to enable communication between the user and a plurality of users (also referred to as 'a global community of users') and experts associated with the report viewing platform 114. The community networking unit 210d allows the user to post his/her query related to a topic mentioned in the research report and request for additional insights in form of a community networking request on the report viewing platform for receiving one or more additional insights from the global community for the query.

The report sharing unit 210e is configured to enable sharing of the research report with at least one contact of the user. The at least one contact of the user can be a team member of the user, colleague of the user, friend of the user or any other known person of the user. The research report can be shared with or without user interaction input (e.g., comments, notes) with the contact of the user. However, it must be noted that the contact of the user must also be a registered user of the report viewing platform for viewing the research content along with the user interaction input. The contact, if a registered user, may also access the one or more interactive tools provided on the research content for providing user interaction inputs.

The custom research unit 210f is configured to enable the user to request for a custom research by sending a custom research request to study issues, opportunities and approaches specific to a business establishment. The user can make request on each slide/section of the research report. After the user is done with completely viewing the report and placing requests for custom research, the custom research unit 210f may frame the custom research requests made by the user on the research report and save the custom research requests under the user account. The custom research unit 210f is also configured to notify the user if the user receives any response on the custom research requests. The responses can include pricing information and process information for the custom research.

In an embodiment, the contribute unit 210g is configured to enable the user to contribute his/her views and thoughts by posting his/her views and thoughts. The contribute unit 210g enables the user to contribute in a survey, author blogs, case studies etc.

The payment module 212 is in operative communication with the registration module 206 and the database 202. The payment module 212 is configured to receive and maintain a record of payment information associated with each user of the plurality of users of the system 200. The payment information may be stored in the database 202 with the record of the user created in the database 202. The payment information includes information about the research reports which the user has purchased, and the information about contacts of the user with which the user wants to share the report.

The language conversion module 214 is in communication with the UI module 204. The language conversion module 214 is configured to convert language of the research document based on a user request for language change. The language conversion module 214 may translate the whole research document in the requested language and provide the research document to the UI module 204 for display.

The database 202, the user interface module 204, the registration module 206, the report generation module 208, the interactive tool management module 210, the payment module 212, the language conversion module 214 may be configured to communicate with each other via or through the centralized circuit system 216. The centralized circuit system 216 may be various devices configured to, among other things, provide or enable communication between the modules (202-214) of the system 200. In certain embodiments, the centralized circuit system 216 may be a central printed circuit board (PCB) such as a motherboard, a main board, a system board, or a logic board. The centralized circuit system 216 may also, or alternatively, include other printed circuit assemblies (PCAs) or communication channel media. In some embodiments, the centralized circuit system 216 may include appropriate storage interfaces to facilitate communication among the modules (202-214). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
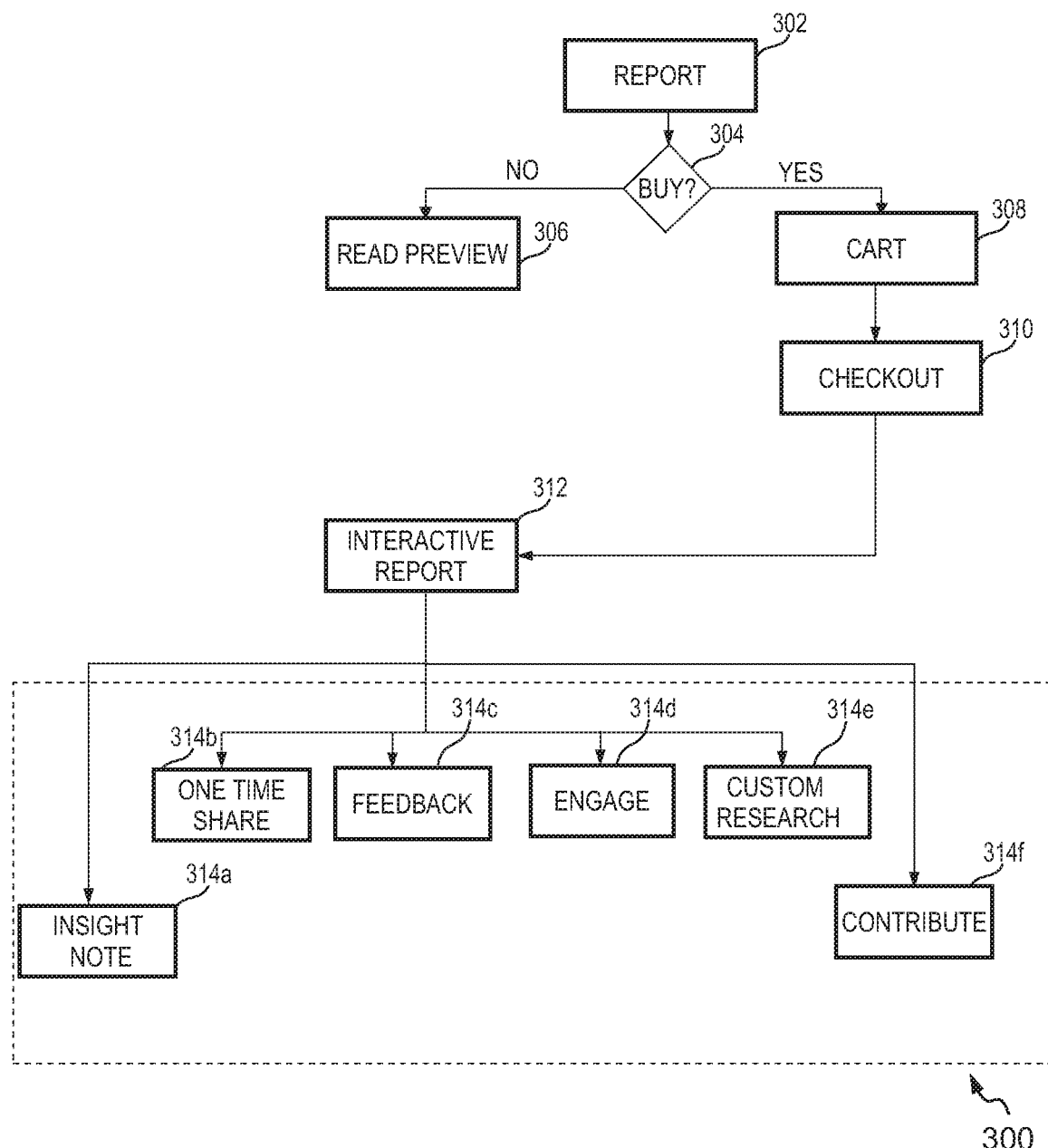
FIG. 3 is a flowchart of a method for viewing an interactive research report on a report viewing platform, in accordance with an example embodiment.

FIG. 3 is a flowchart of a method 300 for viewing interactive research report on the report viewing platform 114, in accordance with an example embodiment. The sequence of operations of the method 300 may not be necessarily executed in the same order as they are presented. Further, one or more operations may be grouped together and performed in form of a single step, or one operation may have several sub-steps that may be performed in parallel or in sequential manner.

At operation 302, a research report/content will be displayed to a user (e.g., the user 106a) in response to a user request placed on the report viewing platform 114 for accessing a research report/content. The research report/content displayed at this step will not contain detailed information. For example, a brief summary or abstract of the research content will be displayed on receiving the user request for the research content. At operation 304, an option for purchasing (buy) the research content may be provided for the user. If the user does not intend to purchase the research report/content, operation 306 is performed else operation 308 is performed.

At 306, the user can only preview the research content. The preview includes the brief description of the research report. At operation 308, if the user chooses to buy the research report, a cart page will be displayed to the user. The cart page may display the cart summary which will include payment information about an amount/fee that needs to be paid by the user and information related to the research report that the user is buying, for example, document size, access credentials, research report sections.

At operation 310, a checkout page may be displayed to the user. The checkout page may include a customer information section where the customer needs to fill his/her personal details, a billing information section, an apply coupon code section where the user can provide a coupon code if the user has any coupon codes and a payment method section defining payment methods available for the payment. The user can choose any payment method from the available methods to complete the payment.

At operation 312, once the payment is done by the user, the user will have the access to all sections of the research content. For example, a detailed report including section wise information may be displayed in form of an interactive research report on the report viewing platform. The interactive research report may provide options to user to navigate through sections in the detailed report using the section wise tabs given in a top part of the report (see, FIGS. 4A-4D). The section wise tabs will help user in moving from one section of the research content to another.

The interactive research report will provide one or more interactive tools 314 on the research content that enables the user to interact and engage with the report and author, for example, capture comments, provide feedback and share the reports with colleagues internally or outside the organization. The one or more interactive tools that are provided on the interactive research report include but are not limited to an insight note tool 314a, a one-time share tool 314b, a feedback tool 314c, an engage tool 314d, a custom research tool 314e and a contribute tool 314f.

In an embodiment, the insight note tool 314a may allow the user to write notes, for example, user interpretation about a section in the research content and/or the research content. The one time share tool 314b may allow the user to share the research report with direct team members, peers, network of friends etc. The feedback tool 314c may allow the user to provide feedback about the research report and the engage tool 314d may allow the user to engage with a chatbot associated with the report viewing platform 114. The custom research tool 314e may allow the user to post their custom research requirement. Similarly, the contribute tool 314f may allow the user to contribute in surveys, blogs, case studies etc.

FIGS. 4A, 4B, 4C and 4D show an example representation of UIs depicting interactive research report/content including the one or more interactive tools displayed to a user, such as the user 106a on his/her user device, such as the device 108a, in accordance with an example embodiment. It shall be noted that the UIs described with reference to FIGS. 4A-4D are displayed to the user who places a request to access a research content on the report viewing platform 114 shown and explained with reference to FIG. 1.

Figure 4A:
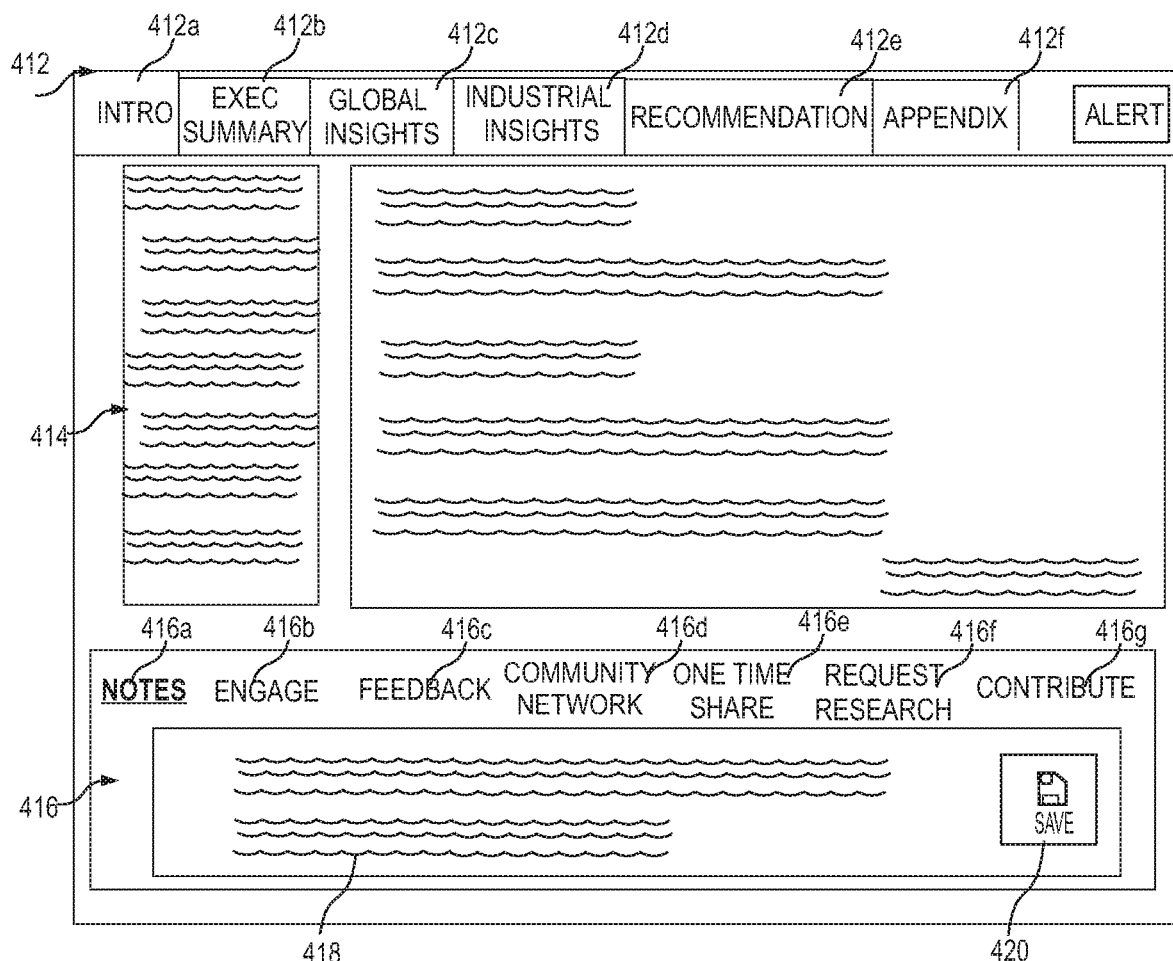
FIG. 4A shows a schematic representation of a UI depicting an interactive tool on the report viewing platform for capturing insights, in accordance with an example embodiment.

Referring now to FIG. 4A, an example representation of a UI 410 displayed on the display screen of the user device. The UI 410 displays the interactive research report/content on a display screen of the user device to the user when the user requests the research content. The UI 410 includes a top section 412, a content section 414 and a bottom section 416. The top section 412 displays a sections wise tabs, such as an introduction tab 412a, an executive summary tab 412b, a global insights tab 412c, an industrial insights tab 412d, a recommendation tab 412e and an appendix tab 412f. The user can navigate to any section of the sections 412a-412f of the research report by clicking on a respective section wise tab. For example, if he/she wants to gain knowledge about industry insights of the research content, he/she can directly view the industry insights by clicking on the industrial insights tab 412d.

The content section 414 displays content from the research content related to a section as indicated by a selection on a section wise tab of the section wise tabs. For example, if the user provides a selection input on global insights tab 412c, content related to global insights on the research content is displayed to the user on the content section 414 of the report viewing platform. In an example, the report viewing platform 114 displays the content associated with the introduction tab 412a, for example, introduction to the research content, The bottom section 416 includes the one or more interactive tools in form of a plurality of tabs, such as a notes tab 416a, an engage tab 416b, a feedback tab 416c, a networking tab 416d, a one time share tab 416e, a request research tab 416f and a contribute tab 416g in the bottom section 416 of the UI 410. Each tab of the plurality of tabs has a specific function.

In an embodiment, by clicking on the notes tab 416a (as seen in FIG. 4A), a text box 418 is displayed. A save button 420 is also provided at a right-side corner of the text box 418. The user can use the text box 418 for writing notes. For example, the user can record insights or interpretation in the text box 418. The notes written in the text box 418 can be saved by clicking on the save button 420 provided in the text box 418. The notes can include the user understanding of a research work, hyperlinks, or any other text content.

Figure 4B:
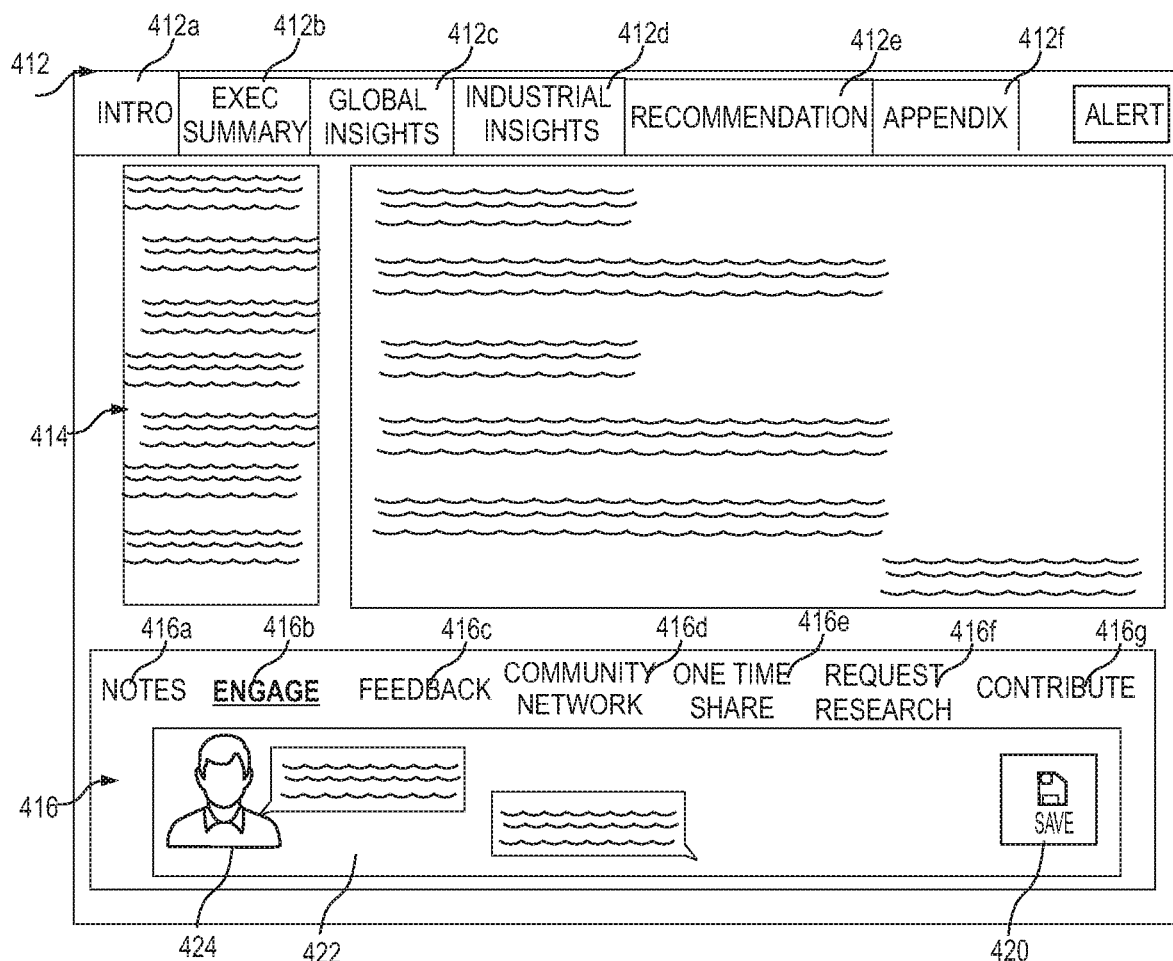
FIG. 4B shows a schematic representation of a UI depicting an interactive tool on the report viewing platform for engaging with a research content via an interactive virtual agent, in accordance with an example embodiment.
Figure 4C:
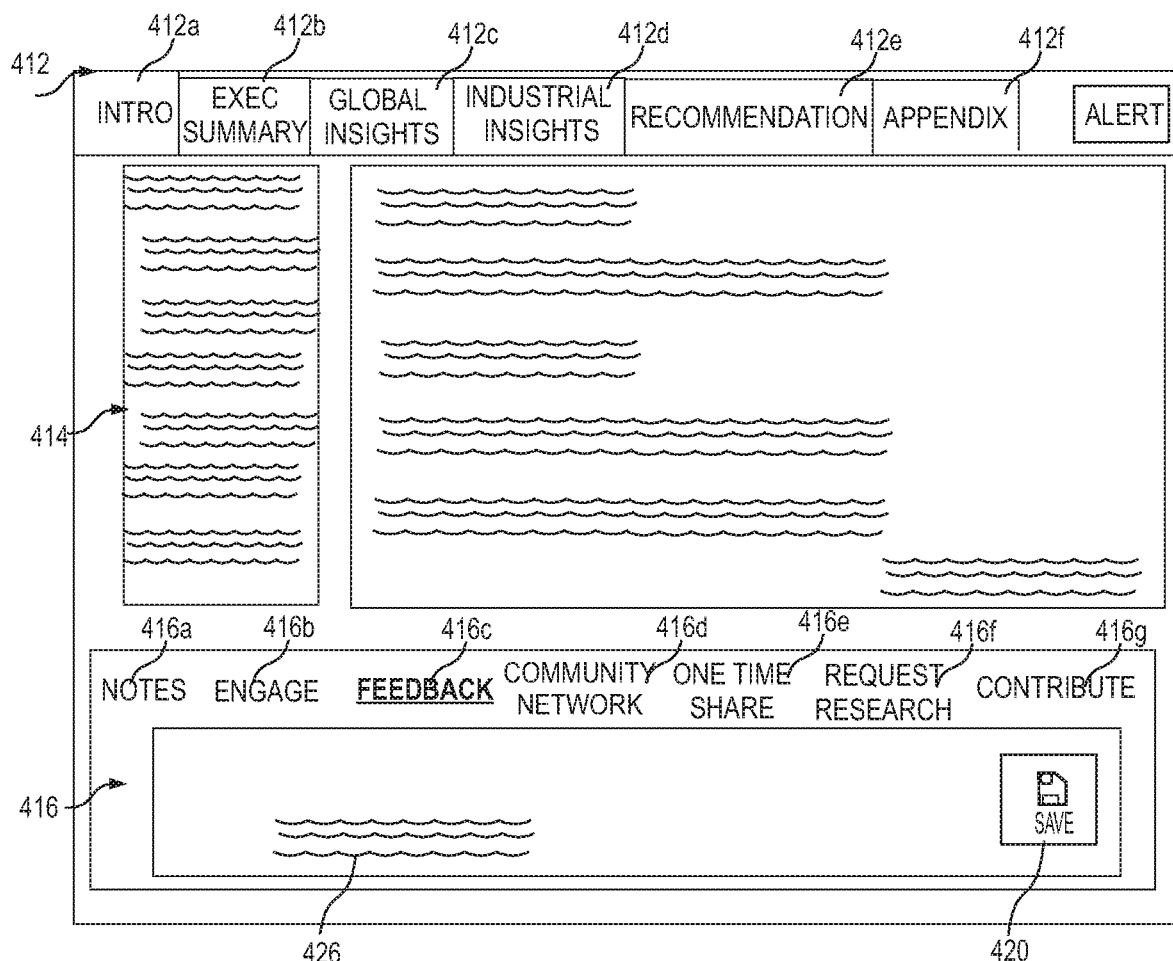
FIG. 4C shows a schematic representation of a UI depicting an interactive tool on the report viewing platform for providing feedback on a research content, in accordance with an example embodiment.
Figure 4D:
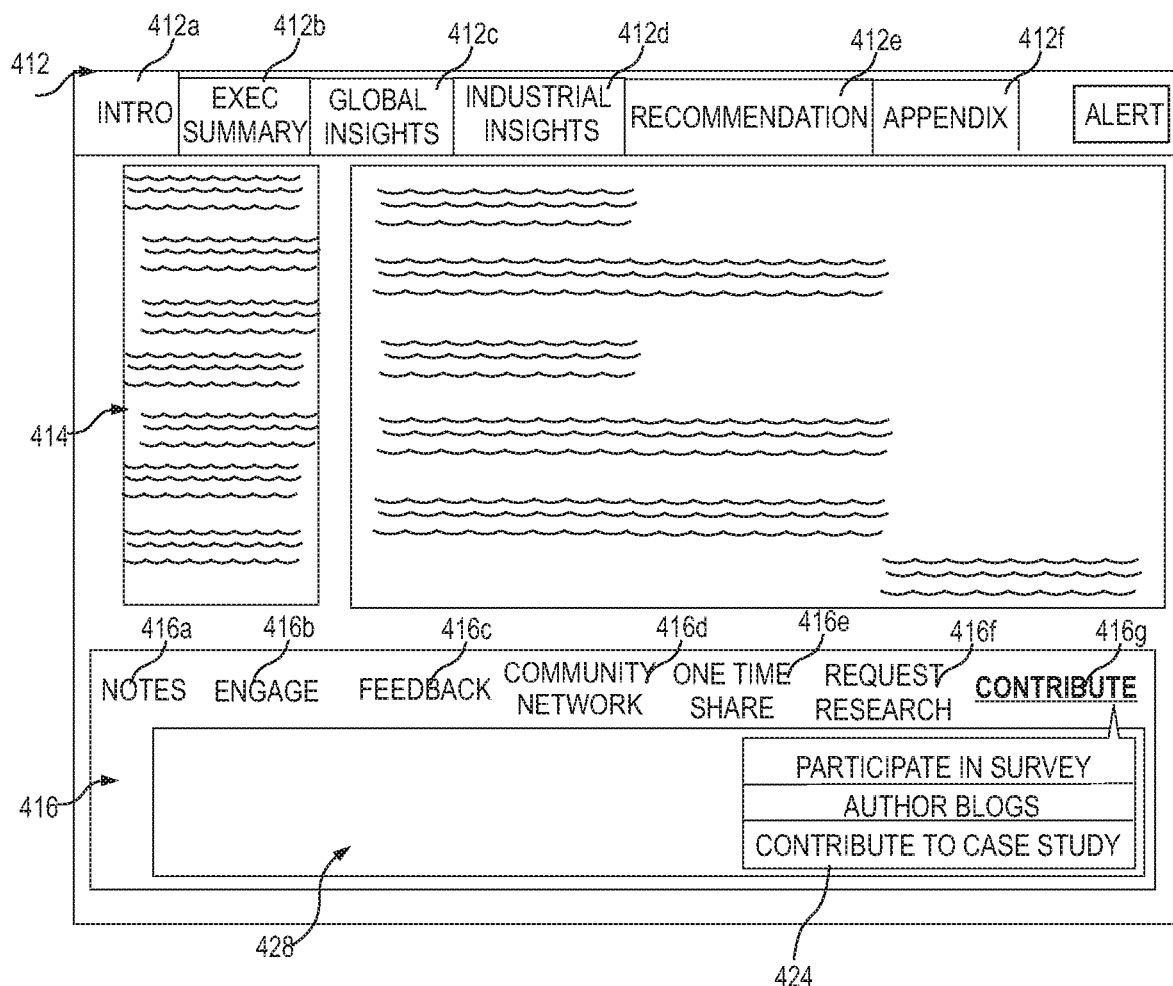
FIG. 4D shows a schematic representation of a UI depicting an interactive tool on the report viewing platform for contributing to a research content, in accordance with an example embodiment.

As shown in UI 420, on clicking the engage tab 416b, a dialog box 422 is opened with an image icon 424 (shown in FIG. 4B). The dialog box 422 is provided by an interactive virtual agent that provides responses for queries posted by the user. The queries may relate to the research content or the report viewing platform 114. For instance, the user may post a query requesting help to navigate in the report viewing platform. The user can post his/her query in the dialog box 422. The chatbot/interactive virtual agent is programmed with Frequently Asked Questions (FAQs) and their answers which will guide the user on the research report. For example, the interactive virtual agent is configured to identify an intent of a query. The interactive virtual agent then selects a response from a plurality of responses stored in a database. If the query includes an intent that is different from the pre-stored intents and corresponding responses, the interactive virtual agent is programmed to provide a friendly response to the user's query.

In an embodiment, a text box 426 (see, UI 430 shown in FIG. 4C) is displayed to the user when the user clicks the feedback tab 416c provided in the bottom section 416 of the UI 420. The user can use the text box 426 for writing feedbacks for an author of the report.

Similarly, on clicking the contribute tab 416g (see, UI 440 shown in FIG. 4D), a drop-down menu 424 comprising options such as "Participate in a Survey", "Author blogs", "Contribute to case study" and "Other" are displayed to the user along with a text box 428 and a save button 430. The user can choose the option "Participate in a Survey" if the user wants to participate in a survey that is being conducted for the research topic related to the research report being displayed. The "Author blogs" option can be chosen if the user wants to contribute something for a blog hosted by the author and "Contribute to case study" if the user wants to provide his inputs on the case study related to the research content. Once the user selects the option from the drop down, the user can provide his contribution in the text box 428. The contribution will be saved by clicking the save button 430 provided along with the text box 428.

Figure 5:
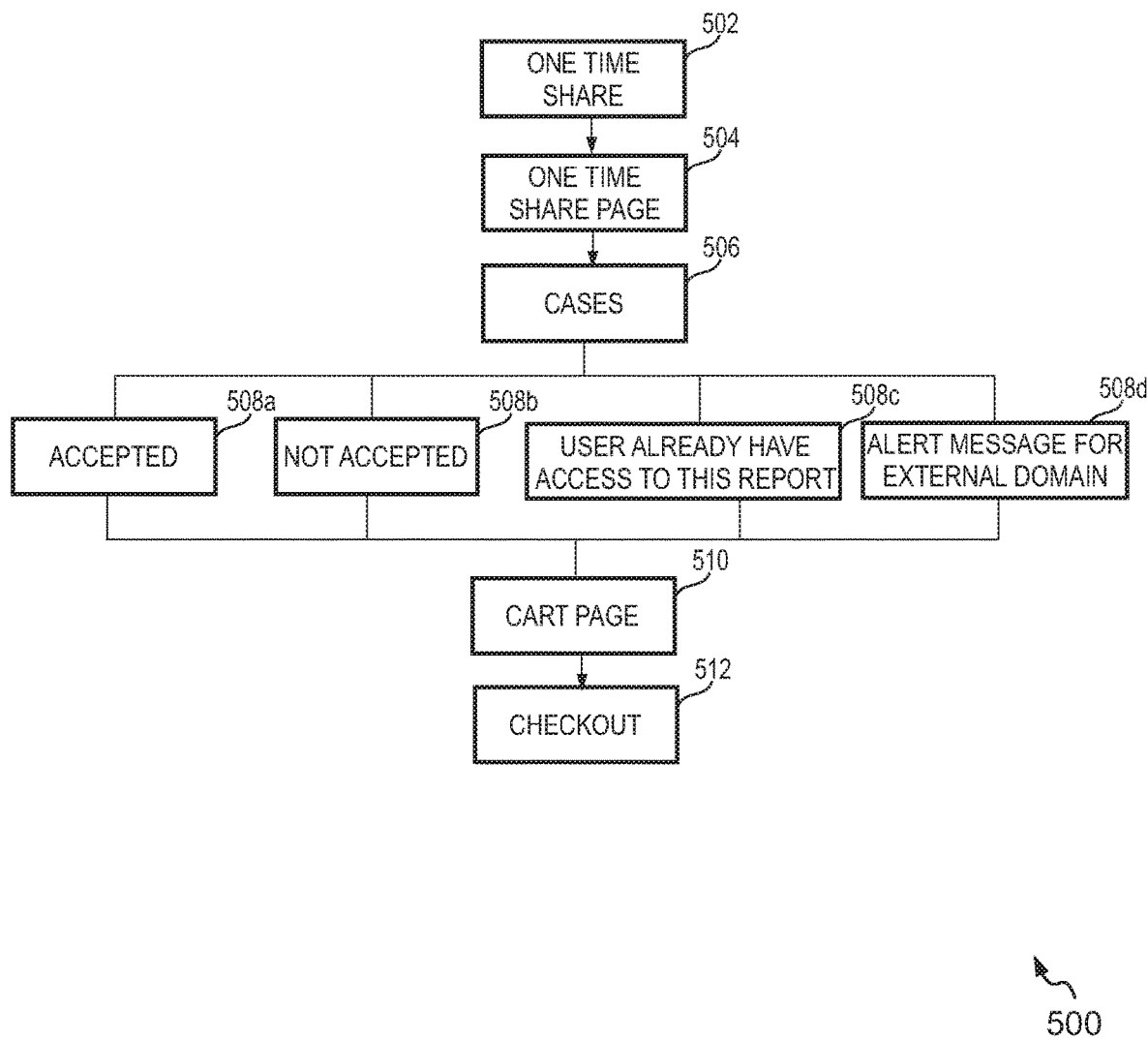
FIG. 5 is a flowchart illustrating a method of sharing an interactive research report with at least one contact of a user, in accordance with an example embodiment.

FIG. 5 is a schematic flow diagram of a method 500 for sharing an interactive research report with a contact of a user, such as the user 106a, in accordance with an example embodiment. The operations of the method 500 may be carried out by a server such as the server 112, the system 200, the devices 108a, 108b and 108c or any combination of the above. The sequence of operations of the method 500 may not be necessarily executed in the same order as they are presented. Further, one or more operations may be grouped together and performed in form of a single step, or one operation may have several sub-steps that may be performed in parallel or in sequential manner.

At operation 502, the user decides to share research report with at least one contact of the user. The contact of the user can be a person working in a same business establishment, a person working in a rival company or any other person known to the user. It should be noted that the at least one contact of the user must be a subscriber of the report viewing platform 114.

At operation 504, the user selects the one time share tab (see, one time share tab 416e shown in FIGS. 4A-4D) which will redirect the user to a one time share page (not shown).

At operation 506, the user may see an email option and the user can provide a plurality of email contacts on the one time share page. For example, the user can enter the email identifier of the persons with whom he/she intends to share the research report in the email option. At operation 508a, in a first scenario, if the user entered the email identifier of the person working in the same organization (or business establishment), the email identifier will be accepted, and the research report will be shared with the person associated with the email identifier. In a second scenario, if the user provides the email identifier of a person working in the rival organization, the email identifier will not be accepted, and the research report will not be shared with the person associated with the email identifier (see, 508b). In a third scenario, as shown in 508c, if the user provides the email identifier of the person who already had access to the research report, the user may receive a notification saying "access to report already exists". As shown by 508d, if the user provides the email identifier of the person who is not working in any organization or his/her domain is different, the user may receive a notification saying "Mail address outside the organization".

At operation 510, the user will be redirected to a cart page where the user can see a payment amount that the user needs to pay if he/she wants to share the research report with the users associated with the email identifiers in the one time share page. The payment amount corresponds to a total amount based on the email identifiers that are accepted/approved to receive the research content. For example, if 3 email identifiers are accepted and for each email identifier, report sharing price is fixed at $10, then the payment amount will be $10*3=$30. At operation 512, the user will do a checkout by performing a transaction for the payment amount. All the email identifiers that are accepted will now have the access to the research report.

Figure 6:
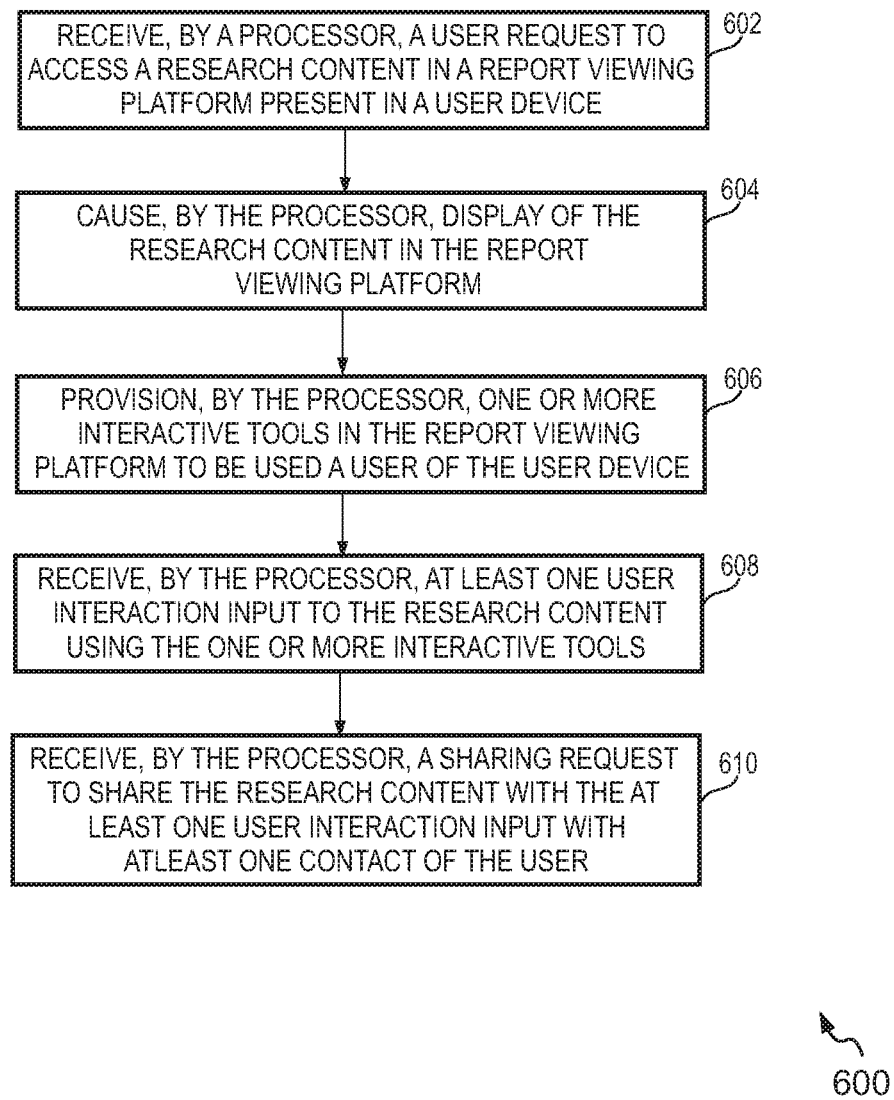
FIG. 6 is a flowchart illustrating a method for interactive research report viewing, in accordance with an example embodiment.

FIG. 6 is a flowchart illustrating a method 600 for interactive research report viewing, in accordance with an example embodiment. The operations of the method 600 may be carried out by a server such as the server 112, the system 200 or the devices 108a, 108b and 108c. The sequence of operations of the method 600 may not be necessarily executed in the same order as they are presented. Further, one or more operations may be grouped together and performed in form of a single step, or one operation may have several sub-steps that may be performed in parallel or in sequential manner.

At operation 602, the method 600 includes receiving, by a processor, a user request to access a research content in a report viewing platform present in a user device. A user may provide a query string related to the research content he/she intends to study in the report viewing platform. The report viewing platform is a software application present in his/her device. At operation 604, the method 600 includes causing, by the processor, display of the research content in the report viewing platform. The research content is prepared based on the query string provided by the user and then displayed to the user on the report viewing platform.

At operation 606, the method 600 includes provisioning, by the processor, one or more interactive tools in the report viewing platform to be used by a user of the user device. The one or more interactive tools are provisioned on the research content displayed to the user in the report viewing platform. The user can use the one or more interactive tools for interacting with the report. The one or more interactive tools have been explained with reference to the interactive tool management module of FIG. 2 and has been omitted herein for the sake of brevity.

At operation 608, the method 600 includes receiving, by the processor, at least one user interaction input to the research content using the one or more interactive tools. The user may provide the at least one user interaction input to the research content using the one or more interactive tools. The at least one user interaction input comprises an insight note provided into the research content. The insight note may be used by the user to save his/her understanding/interpretation or query on the research content. Some other examples of the user interaction input may include but not limited to a feedback for at least an author of the research content, a community networking request for support on topic related to the research content, a custom search request for performing a case study on issues, opportunities and approaches of a business establishment and a contribution provided into the research content in form of surveys, polls, author blogs.

At operation 610, the method 600 includes receiving, by the processor, a sharing request to share the research content with the at least one user interaction input with at least one contact of the user. The user may want to share the research content comprising the at least one user interaction input with at least one contact of the user. The at least one contact is a subscriber of the report viewing platform which means the at least one contact of the user is already a registered user of the report viewing platform. The user may have to pay for sharing the research content with contacts. Further, the user provides contact information, for example, an email identifier of the contact with whom he intends to share the research content At operation 612, the method 600 includes sharing, by the processor, the research content with at least one contact. The research content comprising the at least one user interaction input is shared with at least one contact of the user selected by the user.

FIG. 7 shows a simplified block diagram of an electronic device 700 capable of implementing the various embodiments of the present disclosure. The electronic device 700 may be an example of the user devices 104, 108a, 108b and 108c. In an embodiment, the various embodiments related to interactive research report viewing can be facilitated using a report viewing platform installed in the electronic device 700. It should be understood that the electronic device 700 as illustrated and hereinafter described is merely illustrative of one type of device and should not be taken to limit the scope of the embodiments. As such, it should be appreciated that at least some of the components described below in connection with that the electronic device 700 may be optional and thus in an example embodiment may include more, less or different components than those described in connection with the example embodiment of the FIG. 7. As such, among other examples, the electronic device 700 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 control the allocation and usage of the components of the electronic device 700 and support for one or more applications programs (see, the report viewing platform 114) that implements one or more of the innovative features described herein. The applications 706 may include common mobile computing applications (e.g., telephony applications, email applications, calendars, contact managers, web browsers, messaging applications such as USSD messaging or SMS messaging or SIM Tool Kit (STK) application) or any other application such as, the report viewing platform for interactive report viewing. The report viewing platform is configured to be in operative communication with other applications for example, through the OS or using API Calls, for enabling a user to learn the touch-typing skill.

The illustrated electronic device 700 includes one or more memory components, for example, a non-removable memory 708 and/or a removable memory 710. The non-removable memory 708 and/or the removable memory 710 may be collectively known as database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the facility management application. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. In an embodiment, the input devices 720 are configured to capture user interaction inputs provided on the one or more interactive tools of the report viewing platform 114. Examples of the output devices 730 may include but are not limited to a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed systems and methods with reference to FIG. 1 to 4, or one or more operations of the flow diagrams 500 and 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 8:
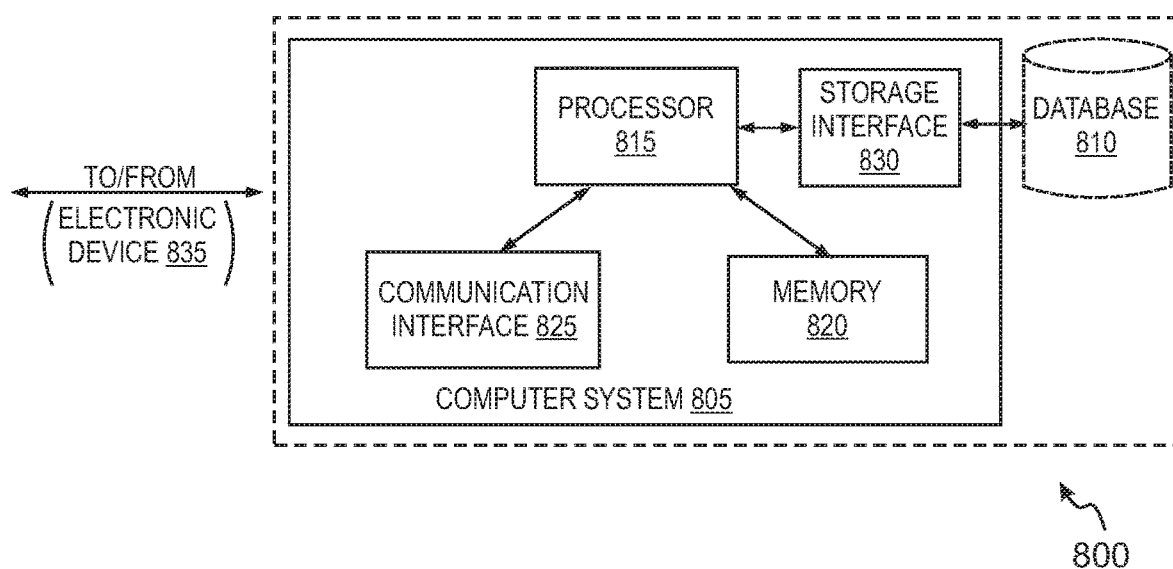
FIG. 8 is a block diagram of a server system of FIG. 1, in accordance with an example embodiment.

FIG. 8 is a simplified block diagram of a server system 800 configured to host and manage the report viewing platform 114 in accordance with one embodiment of the present disclosure. The server system 800 is an example of the server 112 shown and explained with reference to FIG. 1. The server system 800 includes a computer system 805 and one or more databases, such as a database 810.

The computer system 805 includes a processor 815 for executing instructions. Instructions may be stored in, for example, but not limited to, a memory 820. The processor 815 may include one or more processing units (e.g., in a multi-core configuration). The processor 815 is operatively coupled to a communication interface 825 such that the computer system 805 is capable of communicating with a remote device such as an electronic device 835 associated with a user for providing an instance of the report viewing platform on the electronic device. Some examples of the electronic device 835 may include, but are not limited to the devices 104, 108a, 108b and 108c shown in FIG. 1.

The processor 815 may also be operatively coupled to the database 810. The database 810 is configured to store the report viewing platform 114 capable of providing an interactive research report viewing experience to users as explained with reference to FIGS. 1 to 6. The database 810 is any computer-operated hardware suitable for storing and/or retrieving data. The database 810 may include multiple storage units such as hard disks and/or solid-state disks in a redundant array of inexpensive disks (RAID) configuration. The database 810 may include, but not limited to, a storage area network (SAN) and/or a network attached storage (NAS) system.

In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The memory 820 is a storage device embodied as one or more volatile memory devices, one or more non-volatile memory devices, and/or a combination of one or more volatile memory devices and non-volatile memory devices, for storing micro-contents information and instructions. The memory 820 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for interactive research report viewing and thereby allows the users to engage with a displayed research report by allowing the user to share the research report with colleagues or any other person, saving notes on the research report, providing feedback to the author of the report and contribute to the report in real-time. The users are allowed to ask questions and get responses on the research report, which enables the user to explore and interact digitally. The reports are displayed to the users with 'view only' access which restricts any potential plagiarism issues and prevents IP infringement of the author or a company. The reports are available in all major languages, which makes the system multilingual, thereby allow the users to collaborate globally, across languages. Further, the system also offers anywhere anytime access, along with offline viewing which provides an enhanced report viewing experience to the user.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and\or implementation without departing from the spirit or scope of the claims.

What is claimed is:

1. A processor-implemented method, comprising:
   receiving via a report viewing platform, accessed via a user device, a user request to access specific content;
   providing the specific content, via the report viewing platform, to the user device for presentation to a user of the user device via a user interface of the user device;
   receiving via the report viewing platform at least one user interaction input made via a user interface of the user device using one or more interactive tools of the report viewing platform, the at least one user interaction input being associated with the specific content; and
   receiving via the report viewing platform a request from the user to share the specific content with at least one contact of the user and responsively sharing the specific content with at least one contact of the user;
   wherein receiving the at least one user interaction input further comprises receiving a request for performing a custom study specific to a business, wherein such request for performing a custom study is indicated in a manner specific to a section of the specific content; and
   wherein the processor-implemented method further comprises identifying one or more pricings for performing the custom study and causing presentation, via the report viewing platform, of the one or more pricings to the user.

2. The processor-implemented method of claim 1, further embodied as a method of operation in at least one server, wherein the processor-implemented method further comprises retrieving the specific content via the Internet from a remote information store.

3. The processor-implemented method of claim 1, further embodied as a method of operation in at least one server, wherein the specific content is in a first language, wherein the processor-implemented method further comprises identifying a second language associated with the user and translating the specific content from the first language to the second language, and wherein providing further comprises delivering the specific content to the user device in the second language.

4. The processor-implemented method of claim 1, further embodied as a method of operation in at least one server, wherein the at least one user interaction input includes input in a first language associated with the user, wherein the processor-implemented method further comprises identifying a second language and translating the input in the first language to the second language, and wherein receiving the at least one user interaction input comprises storing the input in processor-accessible memory in the second language.

5. The processor-implemented method of claim 1, further embodied as a method of operation in at least one server, wherein the specific content is in a written language format, wherein the processor-implemented method further comprises converting at least part of the specific content from the written language format to an audio format, wherein providing further comprises delivering the at least part of the specific content to the user device in the audio format, and wherein the user device is to use the audio format to present the at least part of the specific content to the user in audio form.

6. The processor-implemented method of claim 1, further embodied as a method of operation in at least one server, wherein the at least one user interaction input is received by the user device from the user in an audible format, wherein the processor-implemented method further comprises converting the audible format to a written language format, and wherein receiving the at least one user interaction input comprises storing the input in processor-accessible storage in the written language format.

7. The processor-implemented method of claim 1, wherein the at least one interaction input comprises a query from the user, and wherein the processor-implemented method further comprises providing, via the report viewing platform, a response to the query to the user device for presentation to the user.

8. The processor-implemented method of claim 1, wherein the user device has a display monitor, and wherein providing comprises providing the content in a format to the user device to render as a visual display to the user via the display monitor.

9. The processor-implemented method of claim 1, wherein:
   the processor-implemented method further comprises receiving a specification from the user of an industry and causing display of one or more suggestions to the user, via the report viewing platform, the one or more suggestions being filtered dependent on the specification of the industry from the user; and
   the request from the user to access the specific content is effective to select the specific content from the one or more suggestions.

10. The processor-implemented method of claim 1, wherein:
    the processor-implemented method further comprises identifying a native language of the user, retrieving a dynamically-translated version of the specific content, the dynamically-translated version being in the native language and in a different written language than an original version of the specific content; and
    providing the specific content further comprises causing the user device to present the dynamically-translated version of the specific content to the user.

11. The processor-implemented method of claim 1, wherein:
    receiving the user interaction input further comprises receiving a community networking request for additional insights on a topic related to the specific content; and
    the processor-implemented method further comprises receiving one or more additional insights for the community networking request from a plurality of individuals associated with the reporting viewing platform, and
    providing, via the report viewing platform, the one or more additional insights to the user device for presentation to the user.

12. The processor-implemented method of claim 1, wherein:
    the processor-implemented method further comprises receiving a query from the user, via the report viewing platform, and providing to the user device, via the report viewing platform, a query response; and the user request comprises a selection from the user which is dependent on the query response.

13. The processor-implemented method of claim 1, wherein the at least one user interaction input comprises a note entered by the user, and wherein the processor-implemented method further comprises saving the note in association with the specific content and in association with an account of the user.

14. The processor-implemented method of claim 1, wherein the at least one user interaction input comprises feedback entered by the user, and wherein the processor-implemented method further comprises receiving a request from the user to share the feedback with an author of the specific content and responsively sharing the feedback with the author of the specific content.

15. The processor-implemented method of claim 1, wherein the at least one user interaction input comprises a comment entered by the user, and wherein the processor-implemented method further comprises receiving a request from the user to share the comment with at least one contact of the user and responsively sharing the comment with the at least one contact of the user.

16. The processor-implemented method of claim 1, wherein the at least one user interaction input comprises a contribution to the specific content, the contribution being supplied by the user, and wherein the processor-implemented method further comprises sharing the contribution along with the specific content with at least one contact of the user.

17. The processor-implemented method of claim 11, wherein receiving the at least one user interaction input further comprises:

receiving from at least one individual who is a subscriber of the report viewing platform respective feedback on the specific content;

performing sentiment analysis on the respective feedback, to generate a summary of feedback for provision to at least one author associated with the specific content; and sharing the summary of feedback with the at least one author associated with the specific content.

18. A system, comprising:

at least one server; and instructions stored on at least one non-transitory medium that when executed are to cause at least one processor associated with the at least one server to, via a report viewing platform hosted by the at least one server, receive, from a user device, a user request to access specific content, provide the specific content to the user device for presentation to a user of the user device via a user interface of the user device, receive at least one user interaction input made via a user interface of the user device using one or more interactive tools of the report viewing platform, the at least one user interaction input being associated with the specific content, and receive a request from the user to share the specific content with at least one contact of the user and responsively share the specific content with at least one contact of the user;

wherein the instructions when executed are further to cause the at least one processor to receive a request for performing a custom study specific to a business, wherein such request for performing a custom study is indicated in a manner specific to a section of the specific content, and identify one or more pricings for performing the custom study and cause presentation, via the report viewing platform, of the one or more pricings to the user.

19. The apparatus of claim 18, further comprising a subscription database stored in server-accessible memory, wherein the at least one contact comprises an individual having an account defined by the subscription database, and wherein instructions, when executed, are to cause the at least one processor associated with the at least one server to responsively share the specific content with the at least one contact in dependence on content of the subscription database.

20. An apparatus comprising instructions stored on at least one non-transitory medium, the instructions when executed to cause at least one processor to, via a report viewing platform hosted by at least one server:

receive, from a user device, a user request to access specific content;

provide the specific content to the user device for presentation to a user of the user device via a user interface of the user device;

receive at least one user interaction input made via a user interface of the user device using one or more interactive tools of the report viewing platform, the at least one user interaction input being associated with the specific content; and receive a request from the user to share the specific content with at least one contact of the user and responsively share the specific content with at least one contact of the user;

wherein the instructions when executed are further to cause the at least one processor to receive a request for performing a custom study specific to a business, wherein such request for performing a custom study is indicated in a manner specific to a section of the specific content, and identify one or more pricings for performing the custom study and cause presentation, via the report viewing platform, of the one or more pricings to the user.

\* \* \* \* \*